United States Patent [19]
Lazarus et al.

[11] Patent Number: 6,107,367
[45] Date of Patent: Aug. 22, 2000

[54] TRAFFIC STRIPE COMPOSITION

[75] Inventors: Richard M. Lazarus, Salem, Oreg.; Amelia M. Nucup, Anaheim, Calif.

[73] Assignee: Jackson Products, Inc., Chesterfield, Mo.

[21] Appl. No.: 09/334,378

[22] Filed: Jun. 16, 1999

[51] Int. Cl.[7] .............................. F21V 7/22; E01F 9/08; C08L 57/02; C08L 23/06; C08L 31/04
[52] U.S. Cl. .............................. 523/172; 404/12; 404/14; 427/137; 524/499; 524/524; 524/528
[58] Field of Search .................. 404/12, 14; 427/137; 523/172; 524/487, 489, 413, 493, 497, 515, 528, 499

[56] References Cited

U.S. PATENT DOCUMENTS

| | | | |
|---|---|---|---|
| Re. 30,463 | 12/1980 | Miller et al. | 523/172 |
| 3,998,645 | 12/1976 | Okazaki et al. | 106/31.04 |
| 4,025,476 | 5/1977 | Miller et al. | 523/172 |
| 4,031,048 | 6/1977 | Holmen et al. | 523/172 |
| 4,086,198 | 4/1978 | Mizui et al. | 523/172 |
| 4,105,808 | 8/1978 | McKenzie | 427/137 |
| 4,297,450 | 10/1981 | Sato et al. | 523/172 |
| 4,324,711 | 4/1982 | Tanaka et al. | 523/172 |
| 4,436,845 | 3/1984 | Kitano | 523/172 |
| 4,690,958 | 9/1987 | Lacoste et al. | 523/172 |
| 4,703,078 | 10/1987 | Maehara et al. | 524/487 |
| 4,752,502 | 6/1988 | Winchester | 427/137 |
| 4,782,109 | 11/1988 | DuLaney et al. | 524/501 |
| 5,248,337 | 9/1993 | Matsubara et al. | 106/434 |
| 5,340,870 | 8/1994 | Clinnin et al. | 523/172 |
| 5,453,320 | 9/1995 | Harper et al. | 428/356 |
| 5,511,896 | 4/1996 | Marcato | 404/72 |
| 5,686,515 | 11/1997 | Phillips et al. | 524/487 |
| 5,820,993 | 10/1998 | Schall et al. | 428/447 |
| 5,824,734 | 10/1998 | Yang | 524/555 |
| 5,861,188 | 1/1999 | Schall et al. | 523/172 |

FOREIGN PATENT DOCUMENTS

| | | | |
|---|---|---|---|
| 114842 | 10/1978 | Japan | 523/172 |
| 08680 | 9/1989 | WIPO | 524/487 |

OTHER PUBLICATIONS

AASHTO Specifications for *White and Yellow Reflective Thermoplastic Striping Material (Solid Form)*, pp. 747–750, date unknown.

Eastman publication *Raw Materials for Thermoplastic Pavement Striping Compounds*, date unknown.

*Primary Examiner*—Peter A. Szekely
*Attorney, Agent, or Firm*—Howell & Haferkamp, L.C.

[57] ABSTRACT

A thermoplastic traffic marking composition that includes resin(s) and at least two polyethylenes, the polyethylenes having a plurality of molecular weights, can be applied as a profiled traffic stripe within a temperature range of about 330° F. to about 380° F., to a road surface, while substantially retaining the profile in which it was applied.

37 Claims, No Drawings

TRAFFIC STRIPE COMPOSITION

BACKGROUND OF THE INVENTION (1) Field of the invention

The present invention relates to traffic marking paints and more particularly to durable thermoplastic traffic marking paints and methods for their preparation and use.

(2) Description of the Related Art

Traffic marking paints for use on pavement, such as road surfaces, are important elements of modern traffic direction and control systems. A key characteristic of markings and lines of these paints is that they are visible under all environmental conditions. Various improvements have been made over the past several years in traffic paint composition and application methods to maximize the visibility of traffic markings in rain and darkness. The incorporation of reflective elements, such as glass beads, has been one such improvement.

It is known, however, that a layer of water on a road that is sufficient to cover a substantially flat traffic marking stripe can render the reflective elements in the paint ineffective. In order to overcome this problem, several methods and devices have been developed that raise the reflective elements above the level of the water film. Among these devices are stick-on raised reflectors (See, e.g., U.S. Pat. No. 3,332,327); the addition of larger glass beads to the stripe to project above the level of the water film; and the application of traffic marking paint in the form of uniformly or non-uniformly thick profiled stripes (See, e.g., U.S. Pat. No. 5,511,896 to Marcato).

Other important characteristics of traffic marking paints are drying rate and durability. Of course, since it is costly to replace traffic markings, it is desirable that the marking paint is durable. However, some durable paints have long drying times—more than about 20 minutes, for example—and their application can cause significant traffic disruption. Thus, it is important to minimize the time between application of the paint and when vehicles can drive over the paints without smearing, smudging, or removing the wet paint, or transferring the wet paint to cars.

Recently, the use of thermoplastics for traffic marking stripes has been reported to provide several advantages over conventional waterborne, or solvent-based traffic paints. In addition to U.S. Pat. No. 5,511,896 to Marcato, mentioned above, thermoplastic traffic marking paints have been disclosed by Okazaki et al. (U.S. Pat. No. 3,996,645); Tanaka et al. (U.S. Pat. No. 4,324,711); Sato et al. (U.S. Pat. No. 4,297,450); McKenzie (U.S. Pat. No. 4,105,808); Mizui et al. (U.S. Pat. No. 4,086,198); Holmen et al. (U.S. Pat. No. 4,031,048). Raw materials for use in formulating thermoplastic marking materials have been discussed in a brochure titled "Raw materials for thermoplastic pavement striping compounds" (available from Eastman Chemical Company, Kingsport, Tenn.).

Thermoplastic materials are normally applied by melting the thermoplastic composition and applying the molten material to the road surface at a temperature of about 350° F. to about 450° F. When the thermoplastic is applied in a thin coating—below about 0.150" in thickness, for example, the material usually cools quickly enough that it remains substantially where it was applied, without significant spreading or running. Once applied, thermoplastics have proved to be very durable and long-lasting traffic markings.

The unique properties of thermoplastics used for traffic paint applications has led at least one group to propose the creation of raised sections of the traffic stripe in order to improve visibility—especially in wet conditions or at night (U.S. Pat. No. 5,511,896). This patent discloses the application of a thick (0.125" to about 0.250") traffic stripe of a suitable thermoplastic to a road. Before the stripe cools and hardens, an embossing wheel rolls over it and creates an embossed footprint of alternately raised and depressed parts of the stripe. A top coating of reflective beads can be added if desired. The objective is to create raised portions of the stripe that can project above a water film and to create reflective surfaces that are more nearly orthogonal to a driver's normal line of vision. However, problems that can occur when a thermoplastic is applied in a thick stripe is that the material must be maintained at a sufficiently high temperature that it will flow quickly, but this higher temperature can result in thermal degradation of the composition over time as it sits in the applicator tank and the thermoplastic laid in a thick line can spread or run to the extent that the dimensions of the line become irregular and poorly defined. Moreover, any irregular raised profile would have a tendency to slump and puddle.

One way to avoid excessive slumping or puddling is to apply the thermoplastic at a cooler temperature. However, this raises another problem, namely that it is more difficult to flow the cooler and more viscous thermoplastic onto the roadway and to insure that it penetrates and forms a tight adhesive bond with the surface. The speed of application of the composition is slowed and, therefore, application cost is increased.

Another way to control slumping is to add fumed silica to the thermoplastic. Fumed silica is an ingredient that is commonly used for its rheology-adjusting properties, but it is expensive and can increase the cost of the thermoplastic marking composition. Thus, it is preferred that the present traffic stripe composition is free of fumed silica.

It would be desirable, therefore, to provide a thermoplastic traffic marking composition that retained the advantages of durability and speed of application provided by such thermoplastic compositions when used for thin stripes, but that also permitted the application of a thick and/or profiled stripe that retained substantially the profile in which it was applied.

SUMMARY OF THE INVENTION

Briefly, therefore the present invention is directed to a novel thermoplastic traffic stripe composition comprising, all in percent by weight of the composition, one or more resins in a total amount of from about 9% to about 16%; two or more polyethylenes, the polyethylenes having a plurality of molecular weights, in a total amount of about 0.5% to about 2.5%; an opacifier; and a plasticizer.

The present invention is also directed to a novel method of preparing a traffic stripe composition comprising the steps of mixing together into a composition, one or more resins in a total amount of from about 9% to about 16%; two or more polyethylenes, the polyethylenes having a plurality of molecular weights, in a total amount of about 0.5% to about 2.5%; about 3% to 10% of an opacifier; about 35% to 45% of a reflective agent; about 1% to 3% plasticizer; all in percent by weight, and an inert filler.

The present invention is also directed to a novel method of marking a roadway for enhanced traffic control comprising applying to the roadway traffic stripe composition as set forth above; and also to a novel road with traffic control marking comprising the traffic stripe composition as set forth above.

Among the several advantages found to be achieved by the present invention, therefore, may be noted the provision of a thermoplastic traffic marking composition that can retain the advantages of durability and speed of application provided by conventional thermoplastic compositions when used for thin stripes; and also the provision of a thermoplastic traffic marking composition that permits the application of a thick and/or profiled stripe that retains substantially the profile in which it was applied.

DETAILED DESCRIPTION OF THE PREFERRED EMBODIMENTS

In accordance with the present invention, it has been discovered that if a thermoplastic traffic marking composition contains about 9% to about 16% by weight of a resin(s), about 0.5% to about 2.5% by weight of a combination of two or more polyethylenes having a plurality of molecular weights, an opacifier and a plasticizer, the composition is easily applicable to road surfaces as a profiled traffic stripe by conventional thermoplastic traffic stripe application equipment within a temperature range that is somewhat below the temperatures normally used for applying such thermoplastic compositions, while substantially retaining the profile in which it is applied. It is believed that the novel thermoplastic traffic stripe composition derives its superior theological properties—as well as other advantageous characteristics, which will be discussed below—from the mixture of one or more resins and two or more polyethylenes that is described above. It has been found to be particularly effective to include two, and especially three different polyethylenes, each having a molecular weight different from the other(s). The blend of polyethylenes of different molecular weights has been found, surprisingly, to provide better flow and set-up properties to the composition than similar compositions including only one polyethylene, or a polymer having only a narrow molecular weight range.

The subject composition can also contain conventional components of opacifiers; reflective agents; plasticizers; inert fillers; pigments; and the like, in the amounts and proportions that are well known for these components in thermoplastic traffic marking compositions.

Surprisingly, it has been found that the subject traffic stripe composition is easily applied at temperature within the range of from about 330° F. to about 380° F. to road surfaces, and substantially retains the profile in which it is applied. This temperature range is somewhat lower than temperatures commonly reported for the application of thermoplastic traffic stripes (e.g., about 400° F. to 450° F., as described in the Eastman Chemical Company brochure cited above) and has the advantage of causing less thermal degradation of pigments, binders and other chemical components of the composition and requiring less energy to melt and maintain as a liquid.

It is believed that any resin that is compatible with and can function as a binder to hold the ingredients of the subject composition together can be used. It is also believed that any grade of resin that is commercially available may be used successfully and the resin can be used neat, or may be used when the resin is present in some carrier liquid or solid. It is preferred that the resin or binder be reasonably cost-effective and be heat stable at temperatures up to about 450° F. Examples of preferred resins include hydrocarbon resins, polystyrene, modified polystyrene, alkyds, polyamides, polyesters, amorphous polypropylene, polyisobutylene, and mixtures or blends thereof. It is most preferred that the resins be hydrocarbon resins and/or ethyl vinyl acetate copolymer resins.

Specific resins that have been found to be particularly preferred are aliphatic hydrocarbon resins, such as that identified as Wingtack,™, mw=2,100, available from Goodyear; ethylene vinyl acetate copolymer resins, such as that identified as Escorene™ (an ethylene vinyl acetate copolymer containing approximately 20% vinyl acetate) available from Exxon Chemical Co.; and aliphatic hydrocarbon resins, such as that identified as Escorez™, mw=2,400, available from Exxon Chemical Co.

It is believed that polyethylene polymers that are useful in the subject composition can be any grade of polyethylene that is commercially available. It has been found that polyethylenes that are useful in the novel thermoplastic composition include low molecular weight polyethylene (having a weight average molecular weight (m.w.) of about 800 to about 2,000); medium molecular weight polyethylene (having a weight average molecular weight of about 20,000 to about 40,000); and high molecular weight polyethylene (having a weight average molecular weight of about 80,000 to about 150,000). When the terms "low", "medium" and "high" are used herein to describe the molecular weight ranges of the polyethylene, they are to be understood to mean the molecular weight ranges specified above. It is understood that polyethylenes, in general, can have much higher, or lower molecular weights than those that have been found to be useful in the subject composition.

Specific examples of low, medium, and high molecular weight polyethylenes include, respectively, low molecular weight polyethylene; m.w.=1,200 (identified as RPW 300™, available from Renkert); medium molecular weight polyethylene; m.w.=26,000(identified as Epolene C-16, available from Eastman Chemical Co., Kingsport, Tenn.); and high molecular weight polyethylene, m.w.=100,000 (identified as Epolene C-17, available from Eastman Chemical Co., Kingsport, Tenn.).

Generally, the polyethylenes can be used as received from the manufacturer with no further preparation.

The inventors believe that the superior durability feature of the novel composition is due, at least to some extent, to the presence of two or more polyethylenes having a plurality of molecular weights, and that the blend of low, medium and high molecular weight polyethylenes, in particular, provides the advantageous thixotropic rheological properties of the composition. By "plurality of molecular weights", what is meant is that the blend of two or more polyethylenes includes at least two polyethylenes having molecular weights that are different from the other(s). By way of example only, this would include a blend of two polyethylenes each having a different molecular weight; a blend of three polyethylenes among which there are at least two polyethylenes having molecular weights that are different from the other(s); and a blend of three polyethylenes each having a molecular weight that is different from the others.

Although it is believed that almost any plasticizer that is commonly used in paints and organic polymers can be used in the subject composition, it is preferred that the plasticizer be substantially non-volatile, be non-water soluble and be compatible with the other ingredients of the subject composition. Preferred examples of plasticizers are phthallic acid compounds, alcohol esters, amine, trimetellitates, and the like. Specific examples of useful plasticizers are dimethyl phthalate, diethyl phthalate, dibutyl phthalate, di-n-octyl phthalate, di-isooctyl pbthalate, di-(2-ethylhexyl) phthalate, dinonyl phthalate, isooctyl isodecyl phthalate, diisodecyl phthalate, diallyl phthalate, butyl benzyl phthalate, dimethyloxyethyl phthalate, mono-isodecyl trimellitate, tri-isooctyl trimellitate, tri-isodecyl trimellitate, trioctyl trimellitate, linear 6,10-phthalate (Alfol 610), linear 8,10-phthalate (Alfol 810) and toluenesulfonamide.

An opacifier is included in the subject composition in an amount sufficient to make the composition optically opaque. It is believed that any opacifier that is suitable for use in paints and coatings can be used in the subject composition. Examples of suitable opacifiers include titanium dioxide, diatomaceous earth, diatomaceous silica and barium sulfate ("blanc fixe"). A preferred opacifier has been found to be titanium dioxide. Titanium dioxide is also useful in the subject composition as a white pigment. Selected grades of $TiO_2$, such as, for example, those grades that are conventionally used in the formulation of paints, are suitable for use in the present composition. One example of a preferred titanium dioxide that can be used in the present invention is that identified as MEARLIN™, available from Mearl Corporation.

A reflective agent, or a blend of two or more reflective agents can be included in the present composition in an amount sufficient to provide enhanced visibility to the composition by reflecting light. Suitable reflective agents are glass beads, sand, any reflective silica compound, and/or any other reflective agent normally used for such purpose in paints and traffic marking compositions. It is believed that the type of reflective material that is used is not critical and any type can be used successfully in the present composition. Glass beads are a preferred reflective agent and more particularly glass beads having any diameter conventionally used in reflective paints are useful in the present invention. Specific examples of glass beads that can be used are those identified as M247, Type 1, available from Potters, Canby, Oreg., or from the Flex-O-Lite division of Jackson Products, Inc. of St. Louis, Mo.

When glass beads are used as a reflective agent in a thermoplastic traffic stripe composition, they are conventionally included at a level of about 25% to about 30% by weight. It has been found, however, that glass beads can be included in the present composition at higher levels—from about 35% to about 45% by weight. This increased amount of glass beads is believed to provide a higher level of retro-reflectance for the subject composition, thereby providing better night visibility to drivers.

An inert filler is also used in the subject composition. Calcium carbonate has been found to be a preferred inert filler material and a calcium carbonate such as that identified as 325 mesh calcium carbonate available from Specialty Minerals, Victorville, Calif., or Pleuss Stauffer, Lucerne Valley, Calif. have been found to be suitable.

Pigments, particularly white and yellow pigments, and other materials can also be added to the subject composition as needed to provide color, hue, reflectivity, emulsion stability, environmental stability and/or any other desirable characteristic.

It has been found that a thermoplastic traffic stripe composition that provides the advantages of the present invention comprises one or more resins in a total amount of from about 9% to about 16%; two or more polyethylenes having a plurality of molecular weights, in a total amount of about 0.5% to about 2.5%; about 3% to 10% of an opacifier; about 35% to 45% of a reflective agent; about 1% to 3% plasticizer; and an inert filler. As used herein, the term "composition" means a mixture, mass, aggregate, or body formed by mixing two or more ingredients. The ingredients of the mixture can be present in a substantially homogeneous basis—given the presence of the reflective agent and the inert filler, or can be a physical mixture of dry ingredients, such as, for example, a mixture of several different types of dry solid materials. Other materials can also be present in the composition, if desired, and an inert filler can comprise substantially the balance of the composition.

The particular property of the subject composition that it is a free flowing liquid during application as a profiled stripe, but retains its profile after deposition upon the road surface derives from the mixture of resin(s) and polyethylenes that is unique to the novel composition. It is preferred that the one or more resins and the two or more polyethylenes are present in amounts and proportions and have molecular weights sufficient to provide that the composition is easily applied at a temperature of from about 330° F. to about 380° F. as a profiled stripe to road surfaces by conventional thermoplastic traffic stripe application equipment, while substantially retaining the profile in which it is applied. As used herein, the terms "profiled stripe" includes almost any physical shape or size of the composition after its application to a road surface in a depth of at least about 1/32", and refers to the three-dimensional profile of the shape in which the composition exited the application shoe, or die, and was deposited onto the road surface. When the terms "substantially retaining the profile in which it is applied" is used herein, what is meant is that the subject thermoplastic composition does not slump, puddle, or run to an extent that destroys the three-dimensional profile of the shape in which the composition exited the application shoe, or die, and was deposited onto the road surface. In other words, if the subject thermoplastic composition exited the application equipment as a ½"-thick-by-4"-wide stripe, it would "substantially retain the profile in which it was applied" if, after cooling and solidifying, it still substantially retained the shape of a ½"-thick-by-4"-wide stripe. While some rounding of the edges and bulging or broadening of the lateral dimensions of the stripe would be acceptable, slumping of the vertical dimension by more than 25%, or broadening of the width by more than 25%, for example, would not be acceptable.

It has been found to be preferred that the two or more polyethylenes are selected among low molecular weight polyethylenes, medium molecular weight polyethylenes and high molecular weight polyethylenes. As described above, it has been found to be more preferred that the two or more polyethylenes have a plurality of molecular weights, and even more preferred that a low molecular weight polyethylene, a medium molecular weight polyethylene and a high molecular weight polyethylene be used.

The subject composition is designed to be applied to a road surface while the composition is at a temperature of from about 330° F. to about 380° F. It is preferred that the composition is thixotropic throughout this temperature range. By "thixotropic", what is meant is that the composition tends to liquify when agitated and to return to a gel form when at rest. Thus, the composition will tend to flow freely on application of pressure or agitation, but to return to a higher apparent viscosity when the application of the pressure or agitation is ceased. Such a property is particularly advantageous during the application of the present composition when the application equipment is designed to agitate the composition during application and to remove all agitation as soon as the composition is extruded onto the road surface in the desired profile. Thus, it is preferred that the one or more resins and the one or more polyethylenes that are ingredients of the subject composition are present in amounts and proportions and have molecular weights sufficient to provide that the composition is thixotropic at a temperature of from about 330° F. to about 380° F.

When the subject composition is a white traffic stripe composition, it is preferred that it comprises two or three resins in a total amount of about 12% to about 16% by weight; and two or three polyethylenes in a total amount of about 0.5% to about 1.5% by weight. It is more preferred that the composition comprises two resins and three polyethylenes; even more preferred that the composition comprises about 12% to about 13% of an aliphatic hydrocarbon resin having a molecular weight of about 2,400; and about 0.5% to about 1.5% of an ethylene vinyl acetate resin; yet more preferred that the composition comprises about 0.4% to about 0.6% of a polyethylene having a molecular weight of about 26,000; about 0.6% to about 0.8% of a polyethylene having a molecular weight of about 100,000; and about 0.1% to about 0.3% of a polyethylene having a molecular weight of about 1,200; and most preferred that the composition comprises about 12.4% of an aliphatic hydrocarbon resin having a molecular weight of about 2,400; about 1% of an ethylene vinyl acetate resin; about 0.5% of a polyethylene having a molecular weight of about 26,000; about 0.7% of a polyethylene having a molecular weight of about 100,000; and about 0.2% of a polyethylene having a molecular weight of about 1,200.

When the traffic stripe composition of the present invention is a yellow traffic stripe composition, it is preferred that it comprises one or two resins in a total amount of about 9% to about 13% by weight; and two or three polyethylenes in a total amount of about 0.5% to about 1.5% by weight; more preferred that the composition comprises one resin and three polyethylenes; yet more preferred that the composition comprises about 13% of an aliphatic hydrocarbon resin having a molecular weight of about 2,400; even more preferred that the composition comprises about 0.3% to about 0.6% of a polyethylene having a molecular weight of about 26,000; about 0.2% to about 0.5% of a polyethylene having a molecular weight of about 100,000; and about 0.1% to about 0.3% of a polyethylene having a molecular weight of about 1,200; and most preferred that the composition comprises about 13% of an aliphatic hydrocarbon resin having a molecular weight of about 2,400; about 0.4% of a polyethylene having a molecular weight of about 26,000; about 0.3% of a polyethylene having a molecular weight of about 100,000; and about 0.2% of a polyethylene having a molecular weight of about 1,200. The yellow traffic stripe composition can, of course, include yellow pigment.

Another feature of the present composition is that the advantageous rheological properties can be obtained without the addition of fumed silica to the mixture. As stated previously, fumed silica is a common additive to such compositions for the purpose of controlling the rheology. The ability to provide a composition with desirable rheological properties without the presence of fumed silica is advantageous because it permits a cost reduction in the composition over the cost if fumed silica was required. In fact, it has been found that the theological properties of the subject composition are unexpectedly superior when the composition is free of fumed silica than when fumed silica is present.

It is believed that the thermoplastic traffic marking composition of the present invention can be prepared by any method that is commonly used for the preparation of thermoplastic traffic marking compositions. One method that is useful is simply mixing together the weighed ingredients for the subject composition in dry form. This dry material can then be packaged, as in sacks, bags, buckets, or barrels, or the like, and shipped to the site of use. There, the dry material is melted and the molten ingredients are intermixed before the composition is applied to the road surface.

Another alternative method for preparing the subject composition is to mix together all of the ingredients of the composition and melting and mixing them together in a molten form. This melt can then be solidified in a mold, or otherwise, and formed into any shape desired for storing, shipping and handling—such as, for example, solid chips or blocks. The chips or blocks can then be re-melted at the site of use for application to the road.

It is believed that the thermoplastic traffic marking composition of the present invention can be used for any marking or striping application for which conventional extrude-type thermoplastic traffic marking compositions are used. Thermoplastic pavement striping compounds can be used wherever conventional traffic marking paints are used, but with the advantages of rapid setup and high durability. The reported life expectancy of thermoplastic compositions has been reported to be as high as 6–8 times that of conventional paints. (See, e.g., *Raw materials for thermoplastic pavement striping compounds,* Eastman Chemical Co., Kingsport, Tenn.). Other advantages of thermoplastics over conventional paints are very low environmental impact, very low release of volatile organic compounds (VOC), better adhesion to the road surface, less chance of overspray, better adhesion retention, and less maintenance.

It is common practice to melt thermoplastic marking compositions in a centrally located premelter and then to distribute the molten and mixed composition to hand-driven or truck-mounted application equipment. However, as an alternative, the composition can be melted in the application equipment. Either method is suitable for the present composition. It is preferred that the composition be melted in a central melter at, for example, a temperature of about 400° F. and then transferred to application equipment where the melt is cooled to its application temperature of about 330° F. to about 380° F.

The subject thermoplastic composition can be applied with any conventional thermoplastic traffic marking equipment. When the terms "conventional thermoplastic traffic marking equipment" are used, what is meant is conventional extrude-type thermoplastic traffic marking equipment such as described, for example, in U.S. Pat. Nos. 5,511,896; 4,802,788; 3,477,352; 5,114,268; 5,642,962; and 5,439,312. The composition can be applied in one coat, or in more than one coat, so long as the subsequent coat or coats bind tightly to the previous coat. Moreover, the subject thermoplastic composition is compatible with a multiple marking process and can be extruded, profiled and embossed with an inverted profile upon or after application. It is a desirable feature of the present composition that the material can be profiled or embossed at the same temperature at which it is applied. This permits such embossing or profiling to be carried out at the same time as application and, potentially, by the same application equipment. Since application and profiling can be done in one operation, the cost of application is minimized.

The following examples describe preferred embodiments of the invention. Other embodiments with the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples.

EXAMPLE 1

This illustrates the formulation of a white thermoplastic traffic marking composition.

The following materials in the designated amounts (all in percent by weight of the total composition) were mixed together in a dry solids mixer: 12.4% aliphatic hydrocarbon resin (Escorez™, molecular weight=2,400, available from Exxon Chemical Company); 1.0% ethylene vinyl acetate (Escorene™, ethylene vinyl acetate copolymer having about 20% by weight vinyl acetate, available from Exxon Chemical Co.); 0.2% low molecular weight polyethylene wax (RPW 300™, m.w.=1,200, available from Renkert); 0.5% medium molecular weight polyethylene (Epolene™ C-16, m.w.=26,000, available from Eastman Chemical Co.); 0.7% high molecular weight polyethylene (Epolene™ C-17, m.w.=100,000, available from Eastman Chemical Co.); 8% titanium dioxide (identified as MEARLIN™, available from Mearl Corporation; 40% glass beads (identified as M247, Type 1, available from Potters, Canby, Oreg.); 2% plasticizer (selected from di-isooctyl phthalate, diethylhexyl phthalate, dinonyl phthalate, isooctyl isodecyl phthalate, diisodecyl phthalate, diallyl phthalate, butyl benzyl phthalate; from Eastman Chemical Co., Kingsport, Tenn., or Exxon Chemical Co.); and with the balance being calcium carbonate.

It was found that the resulting mixture could be melted, mixed and applied in the shape of a traffic marking stripe within a temperature range of about 330° F. to about 380° F., while substantially retaining the three-dimensional profile in which it was applied.

EXAMPLE 2

This illustrates the formulation of a yellow thermoplastic traffic marking composition The following materials in the designated amounts (all in percent by weight of the total composition) were mixed together in a dry solids mixer: 13% aliphatic hydrocarbon resin (Escorez™, molecular weight=2,400, available from Exxon Chemical Company); 0.2% low molecular weight polyethylene wax (RPW 300™, m.w.=1,200, available from Renkert); 0.4% medium molecular weight polyethylene (Epolene™ C-16, m.w.=26,000, available from Eastman Chemical Co.); 0.3% high molecular weight polyethylene (Epolene™ C-17, m.w.=100,000, available from Eastman Chemical Co.); 8% titanium dioxide (as described in Example 1); 40% glass beads (as described in Example 1); 2% plasticizer (as described in Example 1; from 3% to 7% by weight yellow pigment (double encapsulated lead chromate, heat resistant, identified as Krolar Type, available from Heubach Co., NJ); with the balance being calcium carbonate.

It was found that the resulting mixture could be melted, mixed and applied in the shape of a traffic marking stripe within a temperature range of about 330° F. to about 380° F., while substantially retaining the three-dimensional profile in which it was applied.

All references (including without limitation, patents, published patent applications, texts, journal articles, brochures, manuscripts, manufacturer's specification sheets, and the like) cited in this specification are hereby incorporated by reference. The discussion of the references herein is intended merely to summarize the assertions made by their authors and no admission is made that any reference constitutes prior art. Applicants reserve the right to challenge the accuracy and pertinence of the cited references.

In view of the above, it will be seen that the several advantages of the invention are achieved and other advantageous results obtained.

As various changes could be made in the above methods and compositions without departing from the scope of the invention, it is intended that all matter contained in the above description as shown in the accompanying drawings shall be interpreted as illustrative and not in a limiting sense.

What is claimed is:

1. A thermoplastic traffic stripe composition comprising, all in percent by weight of the composition, one or more resins in a total amount of from about 9% to about 16%; two or more polyethylenes different from said resins, the polyethylenes having a plurality of molecular weights, in a total amount of about 0.5% to about 2.5%; an opacifier; and a plasticizer.

2. The traffic stripe composition as set forth in claim 1, consisting essentially of, all in percent by weight of the composition, one or more resins in a total amount of from about 9% to about 16%; two or more polyethylenes, each having a molecular weight different from the other, in a total amount of about 0.5% to about 2.5%; about 3% to 10% opacifier; about 35% to 45% reflective agent; about 1% to 3% plasticizer; and an inert filler.

3. The traffic stripe composition as set forth in claim 1, comprising, all in percent by weight of the composition, one or more resins in a total amount of from about 9% to about 16%; two or more polyethylenes, each having a molecular weight different from the other, in a total amount of about 0.5% to about 2.5%; about 3% to 10% opacifier; about 35% to 45% reflective agent; about 1% to 3% plasticizer; and with the balance being an inert filler.

4. The traffic stripe composition as set forth in claim 1, further comprising a reflective agent and an inert filler.

5. The traffic stripe composition as set forth in claim 4, comprising, all in percent by weight of the composition, about 3% to 10% opacifier; about 35% to 45% reflective agent; and about 1% to 3% plasticizer.

6. The traffic stripe composition as set forth in claim 5, wherein the one or more resins and the two or more polyethylenes are present in amounts and proportions and have molecular weights sufficient to provide that the composition is easily applicable at a temperature from about 330° F. to about 380° F. to road surfaces in the form of a stripe having a profile, where such application is by conventional thermoplastic traffic marking equipment, and where the stripe substantially retains the profile in which it is applied.

7. The traffic stripe composition as set forth in claim 4, wherein the one or more resins and the two or more polyethylenes are present in amounts and proportions and have molecular weights sufficient to provide that the composition is thixotropic at a temperature of from about 330° F. to about 380° F.

8. The traffic stripe composition as set forth in claim 7, wherein the two or more polyethylenes comprise at least two polyethylenes selected from the group consisting of a low molecular weight polyethylene, a medium molecular weight polyethylene, and a high molecular weight polyethylene.

9. The traffic stripe composition as set forth in claim 7, wherein the composition is a white traffic stripe composition that comprises two or three resins in a total amount of about 12% to about 16% by weight; and two or more polyethylenes in a total amount of about 0.5% to about 1.5% by weight.

10. The traffic stripe composition as set forth in claim 9, wherein the composition comprises two resins and three polyethylenes.

11. The traffic stripe composition as set forth in claim 10, wherein the composition comprises about 12% to about 13% of an aliphatic hydrocarbon resin having a weight average molecular weight of about 2,400; and about 0.5% to about 1.5% of an ethylene vinyl acetate resin.

12. The traffic stripe composition as set forth in claim 11, wherein the composition comprises about 0.1% to about 0.3% of a polyethylene having a weight average molecular weight of about 1,200; about 0.4% to about 0.6% of a polyethylene having a weight average molecular weight of about 26,000; and about 0.6% to about 0.8% of a polyethylene having a weight average molecular eight of about 100,000.

13. The traffic stripe composition as set forth in claim 12, wherein the composition comprises about 12.4% of an aliphatic hydrocarbon resin having a weight average molecular weight of about 2,400; about 1% of an ethylene vinyl acetate resin; 0.2% of a polyethylene having a weight average molecular weight of about 1,200; about 0.5% of a polyethylene having a weight average molecular weight of about 26,000; and about 0.7% of a polyethylene having a weight average molecular weight of about 100,000.

14. The traffic stripe composition as set forth in claim 13, wherein the opacifier is titanium dioxide.

15. The traffic stripe composition as set forth in claim 14, wherein the reflective agent is glass beads.

16. The traffic stripe composition as set forth in claim 4, wherein the composition is a yellow traffic stripe composition that comprises one or two resins in a total amount of about 9% to about 13% by weight; and two or three polyethylenes in a total amount of about 0.5% to about 1.5% by weight.

17. The traffic stripe composition as set forth in claim 16, wherein the composition comprises one resin and three polyethylenes.

18. The traffic stripe composition as set forth in claim 17, wherein the composition comprises about 13% of an aliphatic hydrocarbon resin having a molecular weight of about 2,400.

19. The traffic stripe composition as set forth in claim 18, wherein the composition comprises about 0.1% to about 0.3% of a polyethylene having a weight average molecular weight of about 1,200; about 0.3% to about 0.6% of a polyethylene having a weight average molecular weight of about 26,000; and about 0.2% to about 0.5% of a polyethylene having a weight average molecular weight of about 100,000.

20. The traffic stripe composition as set forth in claim 19, wherein the composition comprises about 13% of an aliphatic hydrocarbon resin having a weight average molecular weight of about 2,400; about 0.2% of a polyethylene having a weight average molecular weight of about 1,200; about 0.4% of a polyethylene having a weight average molecular weight of about 26,000; and about 0.3% of a polyethylene having a weight average molecular weight of about 100,000.

21. The traffic stripe composition as set forth in claim 20, wherein the opacifier is titanium dioxide.

22. The traffic stripe composition as set forth in claim 21, wherein the reflective agent is glass beads.

23. The traffic stripe composition of claim 1, wherein the composition is free of fumed silica.

24. A method of preparing a traffic stripe composition comprising the steps of mixing together into a composition, one or more resins in a total amount of from about 9% to about 16%; two or more polyethylenes different from said resins, the polyethylenes having a plurality of molecular weights, in a total amount of about 0.5% to about 2.5%; about 3% to 10% of an opacifier; about 35% to 45% of a reflective agent; about 1% to 3% plasticizer; all in percent by weight, and an inert filler.

25. The method as set forth in claim 24, wherein the inert filler comprises substantially the balance of the composition.

26. The method as set forth in claim 24, wherein the composition is a white traffic stripe composition that is formed by mixing together two or three resins in a total amount of about 12% to about 16% by weight; and two to three polyethylenes in a total amount of about 0.5% to about 1.5% by weight.

27. The method as set forth in claim 26, wherein the composition is formed by mixing together about 12% to about 13% of an aliphatic hydrocarbon resin having a weight average molecular weight of about 2,400; about 0.5% to about 1.5% of an ethylene vinyl acetate resin, about 0.1% to about 0.3% of a polyethylene having a weight average molecular weight of about 1,200; about 0.4% to about 0.6% of a polyethylene having a weight average molecular weight of about 26,000; and about 0.6% to about 0.8% of a polyethylene having a weight average molecular weight of about 100,000.

28. The method as set forth in claim 27, wherein the composition is formed by mixing together about 12.4% of an aliphatic hydrocarbon resin having a weight average molecular weight of about 2,400; about 1% of an ethylene vinyl acetate resin; about 0.2% of a polyethylene having a weight average molecular weight of about 1,200; about 0.5% of a polyethylene having a weight average molecular weight of about 26,000; and about 0.7% of a polyethylene having a weight average molecular weight of about 100,000.

29. The method as set forth in claim 24, wherein the composition is a yellow traffic stripe composition that is formed by mixing together one or two resins in a total amount of about 9% to about 13% by weight; and two or three polyethylenes in a total amount of about 0.5% to about 1.0% by weight.

30. The method as set forth in claim 29, wherein the composition is formed by mixing together about 13% of an aliphatic hydrocarbon resin having a weight average molecular weight of about 2,400; about 0.1% to about 0.3% of a polyethylene having a weight average molecular weight of about 1,200; about 0.3% to about 0.6% of a polyethylene having a weight average molecular weight of about 26,000; and about 0.2% to about 0.5% of a polyethylene having a weight average molecular weight of about 100,000.

31. The method as set forth in claim 30, wherein the composition is formed by mixing together about 13% of an aliphatic hydrocarbon resin having a weight average molecular weight of about 2,400; about 0.2% of a polyethylene having a weight average molecular weight of about 1,200; about 0.4% of a polyethylene having a weight average molecular weight of about 26,000; and about 0.3% of a polyethylene having a weight average molecular weight of about 100,000.

32. The traffic stripe composition as set forth in claim 31, wherein the opacifier is titanium dioxide.

33. The traffic stripe composition as set forth in claim 32, wherein the reflective agent is glass beads.

34. A method of marking a roadway for enhanced traffic control comprising applying to the roadway the traffic stripe composition as set forth in claim 1.

35. The method as set forth in claim 34, wherein the traffic stripe composition is the white traffic stripe composition that is set forth in claim 9.

36. The method as set forth in claim 34, wherein the traffic stripe composition is the yellow traffic stripe composition that is set forth in claim 16.

37. A road with traffic control marking comprising the traffic stripe composition of claim 1.

* * * * *